UNITED STATES PATENT OFFICE.

JULIAN SEGURA, OF NEW YORK, N. Y.

SOLDER FOR ALUMINUM.

1,344,566. Specification of Letters Patent. Patented June 22, 1920.

No Drawing. Application filed May 18, 1920. Serial No. 382,358.

*To all whom it may concern:*

Be it known that I, JULIAN SEGURA, a subject of the Kingdom of Spain, residing at New York, in the county of New York, State of New York, have invented certain new and useful Improvements in Solder for Aluminum; and I do hereby declare the following to be a full, clear, and exact description of the invention, such as will enable others skilled in the art to which it appertains to make and use the same.

My invention relates to improvements in soldering aluminum, and particularly to a solder, which, while dispensing with the necessity of having aluminum itself as a part of its composition will serve to unite plates or sheets of aluminum soldered by it by a bond which does not crystallize or change its permanent character, in any notable degree, even after long continued use. Particularly, the solder constituting the subject matter of the invention is adapted for the soldering not only of aluminum *per se*, but also aluminum alloys of widely varying composition.

The ingredients of my improved solder are zinc, tin, lead, and white metal. The preferred composition of the white metal is 88.9 parts, by weight, of tin; 7.4 parts, by weight, of antimony; and 3.7 parts, by weight, of copper; so that by the use of white metal in the solder I have a ready means of introducing copper into it. As is well known, in white metal, the tin has a range of from 80 to 90%, antimony from 5 to 15%, and copper from 3 to 10%.

The preferred proportions, by weight, of the solder are as follows: 49 parts, by weight, of zinc; 40 parts, by weight, of tin; 10 parts, by weight, of lead; and 1 part, by weight, of white metal.

Some latitude may, however, be tolerated in compounding the solder; thus, for instance, the proportions, by weight, may vary as follows: zinc 40 to 50 parts; tin 35 to 45 parts; lead 10 to 20 parts; white metal 1 to 5 parts.

In applying the solder to the aluminum parts to be united, care must be taken to energetically scrub the surfaces of the aluminum of the intended joint with a stiff metal brush so as to clear the surfaces from all foreign adhesions. The soldering may then be effected by a soldering iron and the solder in the usual manner known to the soldering art.

Having thus described my invention what I claim is:

1. A solder for aluminum composed of zinc ranging from 40 to 50 parts; tin ranging from 35 to 45 parts; lead ranging from 10 to 20 parts; and white metal ranging from 1 to 5 parts (the composition of the white metal ranging from 80 to 90% tin, 5 to 15% antimony, and 3 to 10% copper).

2. A solder for aluminum consisting of 49 parts of zinc; 40 parts of tin; 10 parts of lead; and 1 part of white metal (the composition of the white metal ranging from 80 to 90% tin, 5 to 15% antimony, and 3 to 10% copper).

In testimony whereof I affix my signature.

JULIAN SEGURA.